United States Patent
Miyabe et al.

(10) Patent No.: US 8,233,761 B2
(45) Date of Patent: Jul. 31, 2012

(54) OPTICAL FIBER AND OPTICAL WAVEGUIDE

(75) Inventors: Ryo Miyabe, Tokyo (JP); Keiichi Aiso, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 134 days.

(21) Appl. No.: 12/793,384

(22) Filed: Jun. 3, 2010

(65) Prior Publication Data

US 2010/0239217 A1    Sep. 23, 2010

Related U.S. Application Data

(63) Continuation of application No. 12/187,025, filed on Aug. 6, 2008, now Pat. No. 7,826,701, which is a continuation of application No. PCT/JP2007/072557, filed on Nov. 21, 2007.

(30) Foreign Application Priority Data

Nov. 21, 2006 (JP) ................................ 2006-314857

(51) Int. Cl.
*G02B 6/032* (2006.01)
*G02B 6/02* (2006.01)

(52) U.S. Cl. ........................................ 385/125; 385/123
(58) Field of Classification Search .................. 385/123, 385/125
See application file for complete search history.

(56) References Cited

U.S. PATENT DOCUMENTS

| | | | |
|---|---|---|---|
| 6,097,870 A | 8/2000 | Ranka et al. | |
| 6,792,188 B2 | 9/2004 | Libori et al. | |
| 6,868,213 B2 | 3/2005 | Sasaoka et al. | |
| 7,174,078 B2 | 2/2007 | Libori et al. | |
| 7,228,040 B2 | 6/2007 | Nakajima et al. | |
| 7,826,701 B2 * | 11/2010 | Miyabe et al. | 385/125 |
| 2002/0118938 A1 | 8/2002 | Hasegawa et al. | |
| 2002/0159734 A1 | 10/2002 | Sasaoka et al. | |
| 2004/0033043 A1 | 2/2004 | Monro et al. | |
| 2004/0175084 A1 | 9/2004 | Broeng et al. | |
| 2006/0034574 A1 | 2/2006 | Guan et al. | |
| 2006/0133753 A1 | 6/2006 | Nelson et al. | |
| 2008/0298759 A1 * | 12/2008 | Miyabe et al. | 385/123 |
| 2010/0239217 A1 * | 9/2010 | Miyabe et al. | 385/123 |

FOREIGN PATENT DOCUMENTS

| | | |
|---|---|---|
| EP | 1 788 415 A1 | 5/2007 |
| JP | 2002-277667 | 9/2002 |
| JP | 2002-323625 | 11/2002 |
| JP | 2005-140857 | 6/2005 |
| WO | WO 2006/006604 A1 | 1/2006 |

OTHER PUBLICATIONS

Takemi Hasegawa, "Recent Advances in Photonic Crystal Fibers and Holey Fibers", Dec. 2001, vol. 101, No. 504, pp. 13-18.
Takemi Hasegawa, et al., "Novel Hole-assisted Lightguide Fiber Exhibiting Large Anomalous Dispersion and Low Loss Below 1dB/km", Optical Fiber Communication, Mar. 2001, vol. 54, pp. PD5-1 to PD 5-3.

(Continued)

*Primary Examiner* — Rhonda Peace
(74) *Attorney, Agent, or Firm* — Oblon, Spivak, McClelland, Maier & Neustadt, L.L.P.

(57) ABSTRACT

An optical fiber includes a core region having a first refractive index and a cladding region having a second refractive index lower than the first refractive index on an outer circumference of the core region. The cladding region includes four holes formed to have a four-fold rotational symmetry with respect to a center axis around the core region in a longitudinal direction, such that a zero-dispersion wavelength is 900 nm to 1150 nm and a cutoff wavelength is equal to or shorter than 950 nm.

14 Claims, 15 Drawing Sheets

OTHER PUBLICATIONS

T. A. Birks, et al., "Dispersion Compensation Using Single-Material Fibers", Photonics Technology Letters, vol. 11, No. 6, Jun. 1999, pp. 674-676.

P. J. Bennett, et al., "Toward Practical Holey Fiber Technology: Fabrication, Splicing, Modeling, and Characterization", Sep. 1999, vol. 24, No. 17, Optics Letters, pp. 1203-1205.

J. C. Knight, et al., "Anomalous Dispersion in Photonic Crystal Fiber", Photonics Technology Letters, vol. 12, No. 7, Jul. 2000, pp. 807-809.

Extended European Search Report issued Dec. 20, 2011, in Patent Application No. 07832287.2.

T. Hasegawa, et al., "Hole-assisted lightguide fiber for large anomalous dispersion and low optical loss", Optics Express, OSA (Optical Society of America), vol. 9, No. 13, XP 2251102, Dec. 17, 2001, pp. 681-686.

Tanya M. Monro, et al., "Holey Optical Fibers: An Efficient Modal Model", Journal of Lightwave Technology, IEEE, vol. 17, No. 6, XP 11029440, Jun. 1999, pp. 1093-1102.

* cited by examiner

| | CORE DIAMETER | Δ1 | DISTANCE D |
|---|---|---|---|
| SAMPLE 1 | 6.0 μm | 0.6% | 0 |
| SAMPLE 2 | 6.0 μm | 0.45% | 0 |
| SAMPLE 3 | 6.0 μm | 0.4% | 0.2 μm |

|  | CORE DIAMETER | Δ1 |
|---|---|---|
| SAMPLE 4 | 4.5 μm | 1.0% |
| SAMPLE 5 | 4.5 μm | 0.9% |
| SAMPLE 6 | 5.0 μm | 0.6% |
| SAMPLE 7 | 5.0 μm | 0.8% |

FIG.10

|  |  | DISTANCE D [μm] | | | | | |
|---|---|---|---|---|---|---|---|
|  |  | 0 | 0.2 | 0.4 | 0.6 | 0.8 | 1 |
| HOLE DIAMETER [μm] | 2 | 0.55-0.95 | 0.65-0.85 | — | — | — | — |
|  | 3 | 0.6-0.95 | 0.55-0.85 | 0.65-0.8 | — | — | — |
|  | 4 | 0.6-0.95 | 0.5-0.85 | 0.6-0.8 | 0.6-0.7 | — | — |
|  | 5 | 0.6-0.85 | 0.5-0.8 | 0.5-0.75 | 0.6-0.7 | 0.4-0.5 | — |
|  | 6 | 0.58-0.7 | 0.5-0.65 | 0.5-0.65 | 0.45-0.65 | 0.4-0.6 | — |
|  | 7 | — | — | — | 0.45-0.5 | 0.4-0.55 | — |
|  | 8 | — | — | — | — | — | — |

FIG.11

|  |  | DISTANCE D [μm] | | |
|---|---|---|---|---|
|  |  | 0 | 0.2 | 0.4 |
| HOLE DIAMETER [μm] | 2 | — | — | — |
|  | 3 | 0.6-0.9 | — | — |
|  | 4 | 0.6-0.95 | 0.5-0.55 | — |
|  | 5 | 0.6-0.85 | 0.5-0.75 | — |
|  | 6 | 0.58-0.7 | 0.5-0.65 | — |
|  | 7 | — | — | — |
|  | 8 | — | — | — |

FIG.12

| HOLE DIAMETER [μm] | DISTANCE D [μm] | | | | | | |
|---|---|---|---|---|---|---|---|
| | 0 | 0.2 | 0.4 | 0.6 | 0.8 | 1 | 1.2 |
| 1 | — | — | — | — | — | — | 1.2 |
| 2 | 0.85-1.4 | 0.75-1.2 | 0.8-1.15 | — | — | — | — |
| 3 | 0.9-1.45 | 0.75-1.25 | 0.8-1.15 | 0.75-1.1 | — | — | — |
| 4 | 0.85-1.4 | 0.75-1.25 | 0.8-1.15 | 0.8-1.1 | 0.7-0.9 | — | — |
| 5 | 0.85-0.9 | 0.75-1 | 0.75-0.95 | 0.7-1.0 | 0.7-1.0 | — | — |
| 6 | — | — | — | 0.65-0.75 | 0.65-0.8 | 0.6-0.7 | — |
| 7 | — | — | — | — | — | — | — |

FIG.13

|  |  | DISTANCE D [$\mu$m] | | | | |
| --- | --- | --- | --- | --- | --- | --- |
|  |  | 0 | 0.2 | 0.4 | 0.6 | 0.8 |
| HOLE DIAMETER [$\mu$m] | 1 | — | — | — | — | — |
|  | 2 | 0.85-1.4 | — | — | — | — |
|  | 3 | 0.9-1.45 | 0.75-1.25 | 0.8-0.9 | — | — |
|  | 4 | 0.85-1.4 | 0.75-1.25 | 0.8-1.15 | — | — |
|  | 5 | 0.85-0.9 | 0.75-1 | 0.75-0.95 | 0.7-0.75 | — |
|  | 6 | — | — | — | 0.65-0.75 | — |
|  | 7 | — | — | — | — | — |

FIG.14

| HOLE DIAMETER [μm] | DISTANCE D [μm] | | | | | | | |
|---|---|---|---|---|---|---|---|---|
| | 0 | 0.2 | 0.4 | 0.6 | 0.8 | 1 | 1.2 | 1.4 |
| 2 | — | 1.4-1.5 | 1.25-1.5 | 1.2-1.5 | — | — | — | — |
| 3 | — | 1.4-1.5 | 1.25-1.5 | 1.2-1.5 | 1.05-1.35 | — | — | — |
| 4 | — | 1.35-1.5 | 1.25-1.5 | 1.1-1.5 | 0.9-1.5 | 0.95-1.05 | — | — |
| 5 | — | — | — | 1.1-1.3 | 0.9-1.4 | 0.95-1.15 | — | — |
| 6 | — | — | — | — | — | 0.85-1.1 | 0.8 | — |
| 7 | — | — | — | — | — | — | — | — |

FIG.15

|  |  | DISTANCE D [μm] | | | | |
| --- | --- | --- | --- | --- | --- | --- |
|  |  | 0 | 0.2 | 0.4 | 0.6 | 0.8 |
| HOLE DIAMETER [μm] | 2 | — | 1.4-1.5 | 1.25-1.5 | — | — |
|  | 3 | — | 1.4-1.5 | 1.25-1.5 | 1.2-1.35 | — |
|  | 4 | — | 1.35-1.5 | 1.25-1.5 | 1.1-1.5 | — |
|  | 5 | — | — | — | 1.1-1.3 | — |
|  | 6 | — | — | — | — | — |

FIG.16

|  |  | DISTANCE D [μm] | | | | |
| --- | --- | --- | --- | --- | --- | --- |
|  |  | 0 | 0.2 | 0.4 | 0.6 | 0.8 |
| HOLE DIAMETER [μm] | 2 | — | — | — | — | — |
|  | 3 | 0.55-0.65 | — | — | — | — |
|  | 4 | 0.55-0.65 | 0.55-0.6 | — | — | — |
|  | 5 | 0.55-0.65 | 0.4-0.6 | 0.35-0.45 | — | — |
|  | 6 | 0.4-0.6 | 0.4-0.55 | 0.4-0.55 | — | — |
|  | 7 | 0.4-0.45 | 0.4-0.45 | 0.35-0.45 | — | — |
|  | 8 | — | — | — | 0.3-0.35 | — |
|  | 9 | — | — | — | — | — |

FIG.17

| | Δ1 [%] | CORE DIAMETER [μm] | HOLE DIAMETER [μm] | $\lambda_0$ [nm] | CONFINEMENT LOSS OF $LP_{01}$ [dB/km] |
|---|---|---|---|---|---|
| SAMPLE 10 | 1 | 4 | 2 | 1075 | <0.001 |
| SAMPLE 11 | 0.9 | 4 | 4 | 1021 | 0.004 |
| SAMPLE 12 | 0.9 | 4.5 | 5 | 1051 | <0.001 |
| SAMPLE 13 | 0.8 | 4.5 | 3 | 1070 | 0.07 |
| SAMPLE 14 | 0.6 | 5 | 6 | 1065 | 0.006 |
| SAMPLE 15 | 0.6 | 5 | 3 | 1096 | 0.019 |
| SAMPLE 16 | 0.6 | 6 | 5 | 1122 | 0.002 |
| SAMPLE 17 | 0.6 | 6 | 3 | 1143 | 0.008 |
| SAMPLE 18 | 0.3 | 7 | 8 | 1147 | 0.016 |

US 8,233,761 B2

OPTICAL FIBER AND OPTICAL WAVEGUIDE

CROSS-REFERENCE TO RELATED APPLICATIONS

This application is a continuation of U.S. application Ser. No. 12/187,025 filed on Aug. 6, 2008, which is a continuation of PCT/JP2007/072557 filed on Nov. 21, 2007, the entire contents of both of which are incorporated herein by reference. PCT/JP2007/072557 claims the benefit of the earlier filing date of JP 2006-314857 filed on Nov. 21, 2006.

BACKGROUND OF THE INVENTION

1. Field of the Invention

The present invention relates to an optical fiber and an optical waveguide.

2. Description of the Related Art

In a case of a single-mode optical fiber made of generally-used silica glass, its wavelength dispersion characteristic is expressed by the sum of wavelength dispersion determined based on a refractive index structure of the optical fiber, that is, waveguide dispersion, and wavelength dispersion determined based on optical characteristic of silica glass as a constituent material of the optical fiber, that is, material dispersion. The waveguide dispersion can substantially change the characteristic by changing a refractive-index distribution shape held by the optical fiber. Therefore, a zero-dispersion wavelength in which wavelength dispersion becomes zero can be set to a desired wavelength by adjusting the waveguide dispersion of the optical fiber. However, a wavelength range in which the zero-dispersion wavelength can be easily set by adjusting the waveguide dispersion is 1200 nm or more, and it is difficult to set the zero dispersion characteristic to a wavelength shorter than 1200 nm. The reason for this is explained below. A value of material dispersion held by the silica glass is positive in the wavelength longer than a wavelength of about 1300 nm and expresses anomalous dispersion. However, the positive and negative are reversed in the wavelength of about 1300 nm. In a region of a short wavelength, the value of the material dispersion expresses a large normal dispersion when the wavelength becomes shorter. On the other hand, the waveguide dispersion is basically a normal dispersion in the wavelength larger than about 1000 nm. Even when the wavelength dispersion is shifted to the anomalous dispersion side by changing the refractive-index distribution shape, the absolute value becomes only small. Therefore, the wavelength dispersion as the sum of the material dispersion and the waveguide dispersion of the optical fiber becomes negative. Consequently, it is difficult to set the zero-dispersion wavelength to a wavelength shorter than 1200 nm. Particularly, it is impossible to set the zero-dispersion wavelength to a range of wavelength of 900 nm to 1150 nm as a near-infrared region.

To cope with the problem, in recent years, there has been reported an optical fiber generally called a photonic crystal fiber having many holes formed around a core region made of silica glass. There is a report that a waveguide dispersion having a large absolute value is obtained in the photonic crystal fiber (see, for example, T. A. Birks, et al., "Dispersion compensation using single-material fibers", Photon. Tech. Lett. 11, 674 (1999) and J. C. Knight, et al., "Anomalous dispersion in photonic crystal fiber", Photon. Tech. Lett. 12, 807 (2000)). There is also a report that a single mode operation and a zero-dispersion wavelength characteristic can be obtained in an optional wavelength, by using a structure having this hole formed in the photonic crystal fiber (see, for example, P. J. Bennett, et al., "Toward practical holey fiber technology: fabrication, splicing, modeling, and characterization", Opt. Lett. 24, 1203 (1999)). That is, in the photonic crystal fiber, the refractive index structure of the optical fiber can be substantially changed, by laying out many holes of about 60 to 300 within a cladding region, thereby obtaining waveguide dispersion of a large absolute value. Accordingly, a large anomalous dispersion can be obtained in a near-infrared short-wavelength region, for example. Consequently, the wavelength dispersion can be set to zero, by summing up with the material dispersion having a large normal dispersion. In the photonic crystal fiber, the wavelength dispersion characteristic substantially depends on the sizes of holes and precision of the hole layout. However, because it is difficult to manufacture an optical fiber having many holes laid out in high precision, productivity decreases and cost increases. Further, in the photonic crystal fiber, because a dopant to increase the refractive index of germanium and the like is not added to the core region, effective refractive index is low. As a result, confinement loss of light easily becomes large. To suppress this loss, many hole layers need to be provided. Because, a total number of holes cannot be decreased, productivity further decreases and cost increases.

On the other hand, there is recently reported an optical fiber having a structure called a Hole-assisted Fiber, having holes provided around the core region doped with germanium (see, for example, T. Hasegawa, et al., "Novel hole-assisted light-guide fiber exhibiting large anomalous dispersion and low loss below 1 dB/km", OFC2001, D5-1). According to this hole-assisted fiber, light can be confined strongly to the core region by providing holes, and therefore, macro-bending loss can be decreased. Further, waveguide dispersion can be substantially changed by providing holes near the core region. Unlike the photonic crystal fiber having many holes provided to suppress confinement loss, the hole-assisted fiber has the core region having a higher refractive index than that of the cladding region. Therefore, the effective refractive index becomes higher than the refractive index of the cladding region. Consequently, confinement loss of light can be easily suppressed, without providing many hole layers.

However, regarding the single-mode optical fiber having a zero-dispersion wavelength in the wavelength of 900 nm to 1150 nm as a waveband of which use has been in high demand recently and in which waveband the optical fiber is properly used, it has been difficult and has been at high cost to manufacture the single-mode optical fiber in high precision when a photonic crystal fiber is used.

SUMMARY OF THE INVENTION

It is an object of the present invention to at least partially solve the problems in the conventional technology.

According to an aspect of the present invention, there is provided an optical fiber including a core region having a first refractive index; and a cladding region having a second refractive index lower than the first refractive index on an outer circumference of the core region. The cladding region includes four holes formed to have a four-fold rotational symmetry with respect to a center axis around the core region in a longitudinal direction, such that a zero-dispersion wavelength is 900 nm to 1150 nm and a cutoff wavelength is equal to or shorter than 950 nm.

Furthermore, according to another aspect of the present invention, there is provided an optical waveguide including an optical fiber that includes a core region having a first refractive index, and a cladding region having a second refractive index lower than the first refractive index on an outer circumference of the core region. The cladding region includes four holes formed to have a four-fold rotational symmetry with respect to a center axis around the core region in a longitudinal direction, such that a zero-dispersion wavelength is 900 nm to 1150 nm and a cutoff wavelength is equal to or shorter than 950 nm. The optical waveguide guides a light having a wavelength of 900 nm to 1150 nm.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a table showing a relationship between the hole diameter, the distance D, and the relative refractive index difference Δ1 of the core region satisfying a condition 2, when the core diameter of the core region is 5 μm;

FIG. 11 is a table showing a relationship between the hole diameter, the distance D, and the relative refractive index difference Δ1, when a condition 3 is further added to the condition 2;

FIG. 12 is a table showing a relationship between the hole diameter, the distance D, and the relative refractive index difference Δ1 of the core region satisfying the condition 2, when the core diameter of the core region is 4 μm;

FIG. 13 is a table showing a relationship between the hole diameter, the distance D, and the relative refractive index difference Δ1 of the core region, when the condition 3 is further added to the condition 2;

FIG. 14 is a table showing a relationship between the hole diameter, the distance D, and the relative refractive index difference Δ1 of the core region satisfying the condition 2, when the core diameter of the core region is 3 μm;

FIG. 15 is a table showing a relationship between the hole diameter, the distance D, and the relative refractive index difference Δ1 of the core region, when the condition 3 is further added to the condition 2;

FIG. 16 is a table showing a relationship between the hole diameter, the distance D, and the relative refractive index difference Δ1 of the core region satisfying the condition 2, when the core diameter of the core region is 6 μm;

FIG. 17 is a table showing characteristics of samples 10 to 18 when the distance D is 0 μm;

DETAILED DESCRIPTION OF THE PREFERRED EMBODIMENTS

Exemplary embodiments of an optical fiber and an optical waveguide according to the present invention will be explained below in detail with reference to the accompanying drawings. Note that the present invention is not limited to the embodiments. Further, in the present specification, the cutoff wavelength ($\lambda_c$) means the fiber cutoff wavelength defined in ITU-T (International Telecommunication Union Telecommunication Standardization Sector) G.650.1. Other terms not specified in the present specification follow definitions and measuring methods in ITU-T G.650.1.

Figure 1:
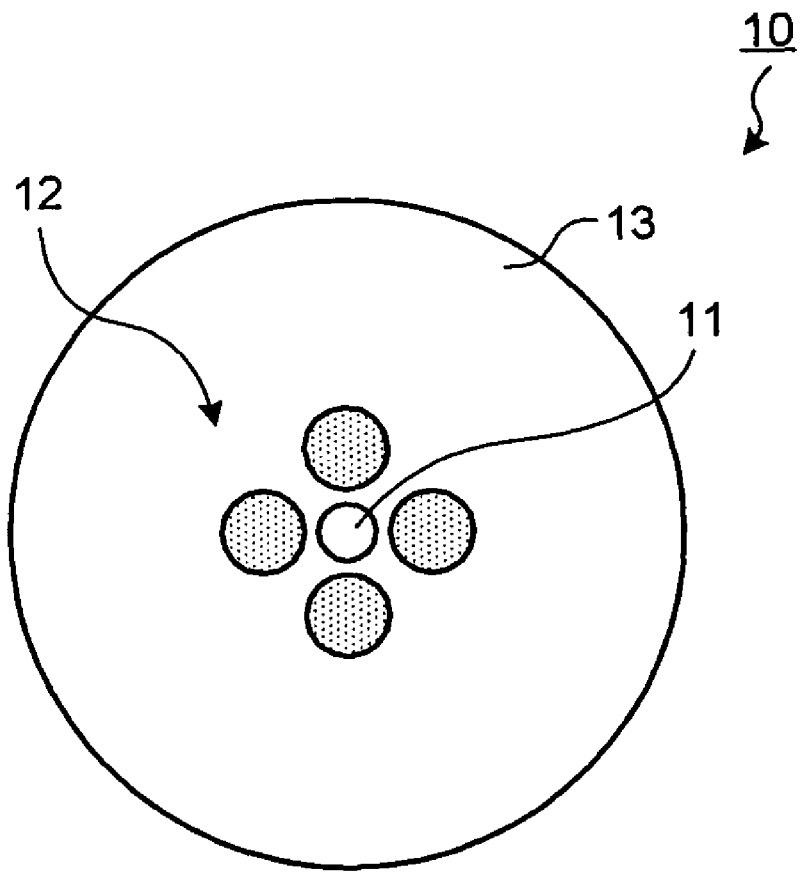
FIG. 1 is a cross section of an optical fiber according to a first embodiment of the present invention.

FIG. 1 is a schematic cross-sectional view of an optical fiber 10 according to a first embodiment of the present invention. As shown in FIG. 1, the optical fiber 10 includes a cladding region 13 having a lower refractive index than that of a core region 11 on the outer circumference of the core region 11, and has four holes 12 formed to have a four-fold rotational symmetry around the center of the core region 11 near the core region 11 within the cladding region 13. A zero-dispersion wavelength is set to 900 nm to 1150 nm, and the cutoff wavelength is set equal to or smaller than 950 nm. The four holes 12 have circular cross-sections, the adjacent holes form an angle of 90 degrees around the center of the core region, and each hole is laid out at an equal distance from the center of the core region 11. As a result, the four holes 12 have the four-fold rotational symmetry around the center of the core region 11.

The optical fiber 10 can be easily manufactured at low cost based on the above configuration, and is suitable for a single-mode transmission of light having the wavelength of 900 nm to 1150 nm. The optical fiber 10 is explained in detail below.

As described above, in the case of an optical fiber made of silica glass, the material dispersion is a normal dispersion in the wavelength shorter than 1300 nm, and its absolute value becomes large when the wavelength becomes shorter. For example, a material dispersion is about −15 ps/nm/km when the wavelength is 1150 nm, a material dispersion is about −22 ps/nm/km when the wavelength is 1100 nm, and a material dispersion is about −30 ps/nm/km when the wavelength is 1050 nm. On the other hand, the waveguide dispersion has an anomalous dispersion of a value equal to or smaller than 10 ps/nm/km in the wavelength longer than the wavelength of 1000 nm. However, in the case of the optical fiber made of general silica glass, even when the refractive index structure made of the core region and the cladding region is changed, the wavelength dispersion as the sum of the material dispersion and the waveguide dispersion has a large negative value and does not become zero, in the range of the wavelength of 900 nm to 1150 nm, because the displacement of the waveguide dispersion is small in the wavelength shorter than the wavelength of 1150 nm.

In the optical fiber 10, a hole is formed within the cladding region 13, and the refractive index structure is greatly changed to greatly shift the waveguide dispersion to the anomalous dispersion side, thereby offsetting the material dispersion. The zero-dispersion wavelength having the sum of the waveguide dispersion and the material dispersion zero is held in the range of the wavelength of 900 nm to 1150 nm. The zero-dispersion wavelength can be adjusted to a desired value by adjusting the relative refractive index difference of the core region to the cladding region, the diameter of the core region, that is, the core diameter, the diameter of the hole, that is, the hole diameter, and the distance between the core region and the hole. Preferably, the zero-dispersion wavelength is set equal to or smaller than 1100 nm. More preferably, the zero-dispersion wavelength is set equal to or smaller than 1050 nm.

Furthermore, the optical fiber 10 includes the four holes 12 formed to have a four-fold rotational symmetry around the center of the core region 11. When the four holes are present, confinement of light to the center core region has proper strength even when the holes 12 are provided near the core region 11, and the cutoff wavelength can be set equal to 950 nm or smaller, and preferably equal to or smaller than 900 nm. Further, when the four holes are present, the holes can be formed in high precision at a designed position, and the hole diameter does not need to be set so small. Therefore, the holes can be formed in sizes in which the holes can be manufactured in high precision. As a result, productivity increases, and cost can be decreased. Because the four holes 12 have the four-fold rotational symmetry around the center of the core region 11, a refractive index distribution of two axes orthogonal with the fiber center on the fiber cross-section becomes equivalent. That is, because no anisotropy of the refractive index distribution occurs, degradation of the polarization mode dispersion (PMD) can be suppressed. From this viewpoint, preferably, the number of holes is four or eight. On the other hand, when the number of holes is an odd number such as three or five, the manufacturing cost does not increase so much due to the provision of the holes. However, anisotropy of the refractive index distribution becomes large, and therefore, the PMD is greatly degraded.

On the other hand, when holes are provided near the center core region, confinement of light to the center core region becomes strong due to the operation of the holes. That is, because the confinement of light to the core region in the high dimensional mode also becomes strong, the cutoff wavelength becomes long. Therefore, it becomes difficult to obtain a cutoff wavelength shorter than 950 nm. When the holes become denser near the center core, the influence becomes larger. For example, when the number of holes is six, and when the waveguide dispersion equivalent to that when the number of holes is four is to be obtained, the area per one hole needs to be substantially increased. Therefore, manufacturing becomes difficult. Further, when the number of holes increases, the manufacturing cost also increases corresponding to the increase of holes. Because of the above, preferably, the number of holes to be laid out is four.

According to the optical fiber 10, a difference between the propagation loss in the wavelength of 1100 nm and that in the wavelength of 1150 nm is equal to or smaller than 1 dB/km. This is explained in detail below. First, in the case of a general optical fiber, contribution of loss due to Rayleigh scattering or the OH group is large in the difference between the propagation loss in the wavelength of 1100 nm and that in the wavelength of 1150 nm. The propagation loss difference generated due to these factors is equal to or smaller than 1 dB. However, in the optical fiber of the structure as represented by the present invention, confinement of light to the core region becomes strong by providing holes near the core region. On the other hand, due to the forming of the holes, the effective refractive index of the core region and the optical propagation unit as the region near the core region and also the light propagation unit decreases. Therefore, there occurs a leakage of light from the core region to the cladding region. When the leakage of light is large in the used waveband, the propagation loss fluctuation becomes large, and the optical power changes inside the optical fiber and is unstable. Therefore, to propagate light in stable power, this leakage of light needs to be set to substantially zero.

The leakage of light is generally called confinement loss. The confinement loss greatly depends on wavelength, and becomes large when the wavelength becomes large. Light of a wavelength larger than the wavelength in which the confinement loss begins affecting the propagation loss is little propagated.

The fact that the difference between the propagation losses in the wavelength of 1100 nm and in the wavelength of 1150 nm is equal to or smaller than 1 dB/km means that the confinement loss of light in the wavelength of 1150 nm is equal to or smaller than 0.1 dB/km. However, when the loss due to the OH group is large, the difference between the propagation loss in the wavelength of 1100 nm and that in the wavelength of 1150 nm exceeds 1 dB, only because of this large loss due to the OH group. Therefore, the propagation loss in the wavelength of 1150 nm is set equal to or smaller than 3 dB/km.

As described above, the confinement loss of light becomes large when the wavelength dependency is large and also when the wavelength becomes large. Therefore, when the confinement loss of light is large, the difference between the propagation loss in the wavelength of 1100 nm and that in the wavelength of 1150 nm becomes equal to or larger than one digit to two digits based on dB/km as a unit. On the other hand, when the confinement loss of light and the loss due to the OH group is not so large, the difference between the propagation loss in the wavelength of 1100 nm and that in the wavelength of 1150 nm is not so large, and becomes equal to or smaller than 1 dB/km. As a result, the confinement loss of light in the wavelength of 1150 nm can be expressed, based on the difference between the propagation loss in the wavelength of 1100 nm and that in the wavelength of 1150 nm when the propagation loss in the wavelength of 1150 nm is equal to or smaller than 3 dB/km. That is, when the difference between the propagation loss in the wavelength of 1100 nm and that in the wavelength of 1150 nm is equal to or smaller than 1 dB/km, the confinement loss of light in the wavelength of 1150 nm can be said to be equal to or smaller than 0.1 dB/km.

According to the optical fiber 10, the difference between the propagation loss in the wavelength of 1100 nm and that in the wavelength of 1150 nm is equal to or smaller than 1 dB/km, that is, the confinement loss of light in the wavelength of 1150 nm is equal to or smaller than 0.1 dB/km. Because the confinement loss becomes extremely small, power of light is stabilized without changing along time. According to the optical fiber 10, the propagation loss in the wavelength of 900 nm to 1150 nm is equal to or smaller than 10 dB/km, preferably, 3 dB/km. Therefore, in the range of the optical fiber used in the length from a few tens of meters to a few hundreds of meters, propagation loss of light can be suppressed and the fluctuation of power of light emitted from the optical fiber can be minimized.

In the optical fiber 10, the core region 11 is silica glass doped with germanium or phosphorus. Therefore, the refractive index of the core region 11 can be increased while suppressing the propagation loss of light propagated through the core region 11. The cladding region 13 is silica glass doped with fluorine and having a low refractive index or pure silica glass not containing a dopant for adjusting a refractive index, and has a lower refractive index than that of the core region 11. As methods of adding germanium or phosphorus to the core region, there are the VAD (Vapor-phase Axial Deposition) method and the MCVD (Modified Chemical Vapor Deposition) method. When the VAD method or the MCVD method is used, the added amount of germanium or phosphorus can be fine adjusted. As a result, the relative refractive index difference $\Delta 1$ from the core region 11 to the cladding region 13 can be adjusted at every 0.01%.

Because the relative refractive index difference $\Delta 1$ from the core region 11 to the cladding region 13 is equal to or higher than 0.3%, the confinement loss of light generated due to the forming of holes near the core region 11 can be suppressed to 0.1 dB/km or smaller. The relative refractive index difference $\Delta 1$ is equal to or smaller than 1.5%, and preferably, equal to or smaller than 1.0%. Therefore, generation of nonlinear optical effect in the optical fiber can be suppressed, and the cutoff wavelength can be easily set equal to or smaller than 950 nm. Further, because the relative refractive index difference $\Delta 1$ is equal to or smaller than 1.5%, the addition concentration of germanium or phosphorus is not so high. Therefore, for example, in the case of forming holes on the optical fiber base material using a mechanical drill, the core itself is not easily broken.

The above relative refractive index difference $\Delta 1$ is defined by $$\Delta 1 = \{(n_{core} - n_{clad})/n_{core}\} \times 100 [\%]$$

where $n_{core}$ and $n_{clad}$ represent a maximum refractive index of the core region and a refractive index of the cladding region, respectively.

Figure 2:
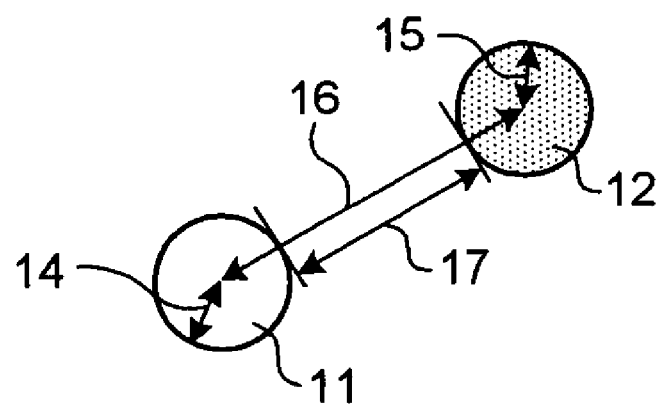
FIG. 2 is a schematic diagram for illustrating a shortest distance D between a core region and a hole.

Next, the core region and the hole of the optical fiber 10 are explained in further detail using a calculation result of a simulation. In the following explanations, as shown in FIG. 2, the core region and the hole are explained using a distance D as a shortest distance 17 between the core region 11 and the hole 12 defined by $$D = \{L - (A+B)\}/2$$

where a core diameter 14 of the core region 11 is A µm, a hole diameter 15 of the hole 12 is B µm, and a distance 16 between the center of the core region 11 and the center of the hole 12 is L. The core diameter of the core region 11 is a diameter at a position having a relative refractive index difference of a half of $\Delta 1$ in the boundary region between the core region 11 and the cladding region 13.

First, the core diameter of the core region 11 is explained. Because the core diameter is equal to or smaller than 7 µm, the zero dispersion wavelength can be easily set equal to or smaller than 1150 nm and the cutoff wavelength can be easily set equal to or smaller than 950 nm, while leaving the $\Delta 1$ equal to or larger than 0.3%.

Figures 3, 4:
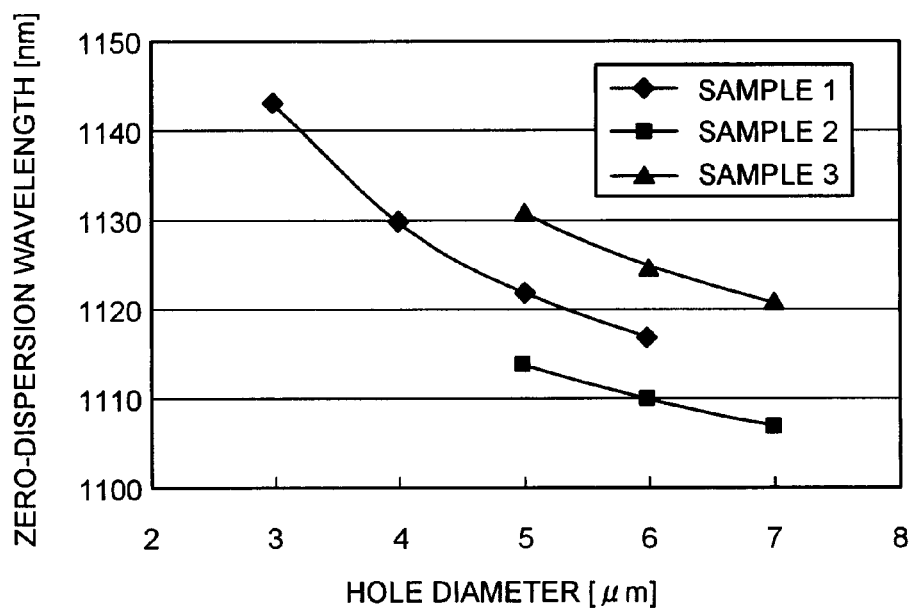
FIG. 3 is a table showing characteristics of samples 1 to 3, having a core diameter fixed to 6 μm and a relative refractive index difference Δ1 and the distance D appropriately changed.
FIG. 4 is a graph of a relationship between a hole diameter and a zero-dispersion wavelength in the samples 1 to 3.

When the core diameter is smaller than 6 µm, the zero dispersion wavelength can be set equal to or smaller than 1100 nm, and this is preferable. This is explained below. FIG. 3 depicts various characteristics of samples 1 to 3, having the core diameter fixed to 6 µm and having the relative refractive index difference $\Delta 1$ and the distance D properly changed, in the optical fiber 10. FIG. 4 depicts a relationship between a hole diameter and a shortest zero-dispersion wavelength in the samples 1 to 3, when the cutoff wavelength is set to 950 nm. In FIG. 4, a range having no plot means that the cutoff wavelength does not become equal to or smaller than 950 nm or confinement loss in the wavelength of 1150 nm becomes equal to or larger than 0.1 dB/km. As shown in FIG. 4, in the samples 1 to 3, when the hole diameter is equal to or smaller than 7 µm, the zero dispersion wavelength can be set equal to or smaller than 1150 nm and the cutoff wavelength can be set equal to or smaller than 950 nm at the same time.

Figures 5, 6:
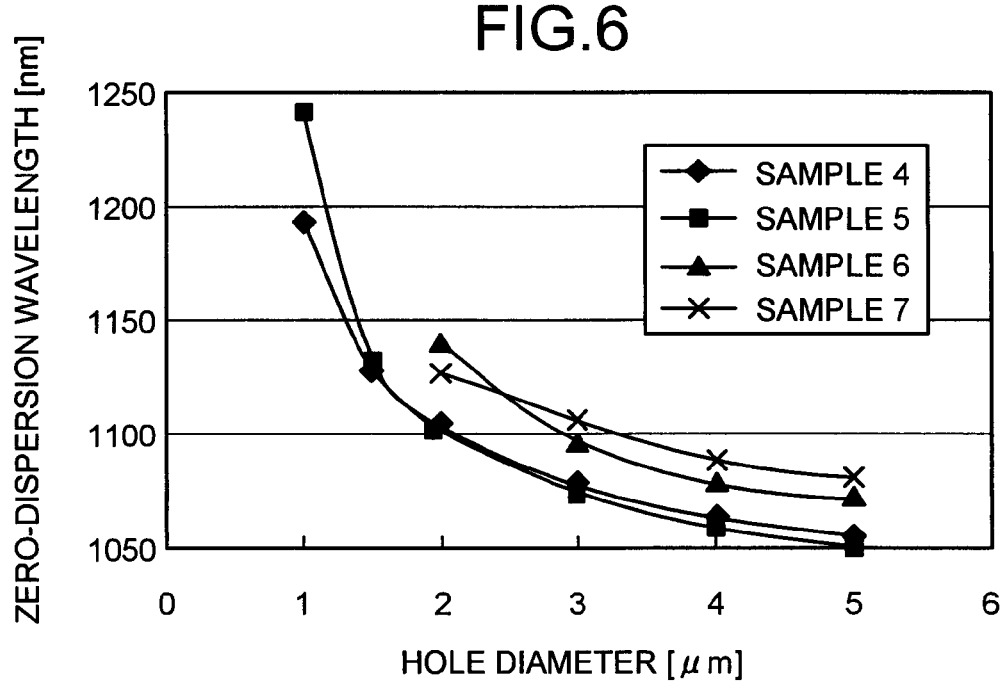
FIG. 5 is a table showing characteristics of samples 4 to 7, having the distance D fixed to 0 μm and the core diameter and the relative refractive index difference Δ1 appropriately changed.
FIG. 6 is a graph of a relationship between a hole diameter and a zero-dispersion wavelength in the samples 4 to 7.

On the other hand, FIG. 5 depicts various characteristics of samples 4 to 7, having the distance D fixed to 0 µm, that is, the core diameter and the relative refractive index difference $\Delta 1$ are properly changed, by fixing a condition that the core region 11 and each hole 12 are in contact with each other, in the optical fiber according to the first embodiment. FIG. 6 depicts a relationship between the hole diameter and the shortest zero-dispersion wavelength in the samples 4 to 7, when the cutoff wavelength is set to 950 nm. In FIG. 6, a range having no plot means that the cutoff wavelength does not become equal to or smaller than 950 nm or the confinement loss in the wavelength of 1150 nm becomes equal to or larger than 0.1 dB/km, like the range shown in FIG. 4. As shown in FIG. 6, in the range where the hole diameter is equal to or larger than 6 µm, the cutoff wavelength does not become equal to or smaller than 950 nm. In the range where the hole diameter is smaller than 2 µm, confinement loss in the fiber structure increases, and the confinement loss in the wavelength of 1150 nm becomes equal to or larger than 0.1 dB/km. In the samples 4 to 7, while the core diameter is smaller than 6 µm, the cutoff wavelength can be easily set equal to 950 nm or smaller by properly setting the hole diameter as shown in FIG. 6. That is, in the optical fiber 10, preferably, the core diameter is set smaller than 6 µm.

Preferably, the core diameter of the core region 11 is set equal to or larger than 3 µm. That is, when the core diameter is equal to or larger than 3 µm, the intensity and density of light within the core region do not become excessively large. The confinement loss of light can be set equal to or smaller than 0.1 dB/km while setting the relative refractive index difference $\Delta 1$ smaller than 0.9%. Further, in connecting other optical fiber to the optical fiber 10, the core diameter can be easily adjusted and the connection loss can be suppressed.

On the other hand, when the core diameter is larger than 7 µm, to shift the zero-dispersion wavelength to the wavelength shorter than the wavelength of 1150 nm in the structure having the holes, the relative refractive index difference to the cladding region needs to be set equal to or smaller than 0.3%, and this is not preferable from the viewpoint of the confinement loss of light, as described above. When the core diameter becomes large, the cutoff wavelength shifts to a long wavelength. From this viewpoint, preferably, the core diameter is set equal to or smaller than 7 µm. More preferably, the core diameter is smaller than 6 µm. In the condition that the core diameter is equal to or larger than 6 µm, when the cutoff wavelength is attempted to be set equal to or smaller than 950 nm, the zero-dispersion wavelength is within the range of 1100 nm to 1150 nm, even when the interval between the hole and the core region and the size of the hole diameter are adjusted, and the dispersion wavelength cannot be set to a shorter wavelength than 1100 nm. This will be explained in detail later.

Figure 7:
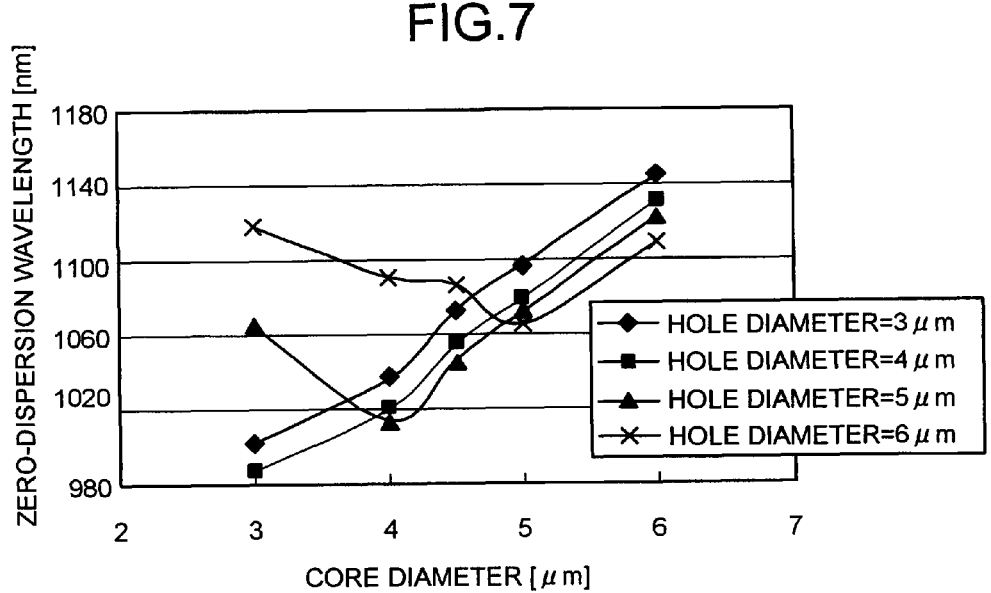
FIG. 7 is a graph of a relationship between a core diameter and a shortest zero-dispersion wavelength in a condition of each hole diameter, when a cutoff wavelength is equal to or smaller than 950 nm.

FIG. 7 depicts a relationship between the core diameter and the shortest zero-dispersion wavelength in the condition of each hole diameter, when the cutoff wavelength is equal to or smaller than 950 nm. As shown in FIG. 7, when the core diameter is 6 µm, the zero-dispersion wavelength is within the range of 1100 nm to 1150 nm at any hole diameter. Therefore, preferably, the core diameter is equal to or smaller than 6 µm. When the core diameter becomes smaller or when the hole diameter becomes larger, a large waveguide dispersion is obtained. Therefore, the zero-dispersion wavelength shifts to the short wavelength side. However, because the cutoff wavelength shifts to the long wavelength side, when the cutoff wavelength is set equal to or smaller than 950 nm in the condition that the hole diameter is 5 and 6 µm, the zero-dispersion wavelength does not become a short wavelength even when the core diameter is made small.

Figure 8:
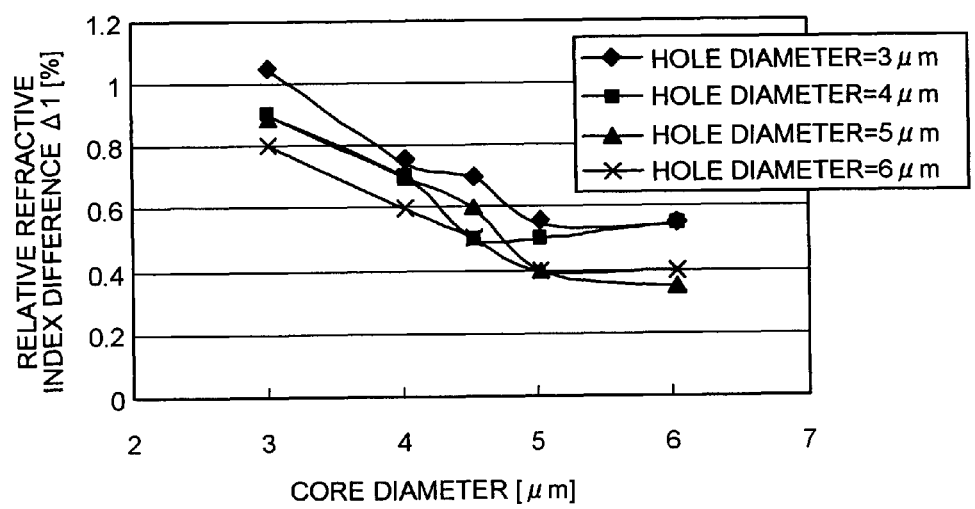
FIG. 8 is a graph showing a minimum relative refractive index difference Δ1 of the core region to the cladding region, when the zero-dispersion wavelength is equal to or smaller than 1150 nm and also when confinement loss of light in the wavelength of 1150 nm is equal to or smaller than 0.1 dB/km, in each core diameter.

FIG. 8 depicts the minimum relative refractive index difference $\Delta 1$ of the core region to the cladding region, when the zero-dispersion wavelength is equal to or smaller than 1150 nm and also when the confinement loss of light in the wavelength of 1150 nm is equal to or smaller than 0.1 dB/km, in each core diameter. As shown in FIG. 8, when the core diameter is 3 µm, the relative refractive index difference $\Delta 1$ needs to be set equal to or larger than 0.8%.

As shown in FIG. 7, when the core diameter is 3 µm, to set the zero-dispersion wavelength equal to or smaller than 1100 nm, the relative refractive index difference $\Delta 1$ of the core region needs to be set equal to or larger than 0.9% when the hole diameter is equal to or smaller than 5 µm. On the other hand, as shown in FIG. 7, when the core diameter is equal to 3 µm and also when the hole diameter is equal to or larger than 6 µm, the zero-dispersion wavelength cannot be set equal to or smaller than 1100 nm. In making the core diameter smaller, to suppress the confinement loss of light, the relative refractive index difference of the core region needs to be set equal to or larger than 1.0%, and this is not preferable.

When the core diameter is made smaller than 3 µm, a mode field diameter also becomes very small, and the influence of the nonlinear optical effect becomes large. As a result, coupling of light is substantially degraded at the time of inserting light into the optical fiber. Further, connection loss of connection with other optical fiber also becomes large. Therefore, preferably, the core diameter is equal to or larger than 3 µm.

The hole diameter of the hole 12 is larger than 1.5 µm, and is preferably equal to or larger than 2 µm. Therefore, a desired zero-dispersion wavelength can be obtained by sufficiently shifting the waveguide dispersion to the anomalous dispersion side. This is explained below with reference to FIGS. 5 and 6. As shown in FIG. 6, when the hole diameter is 1.5 µm, that is, larger than 1 µm, in the samples 4 and 5, the zero dispersion wavelength becomes equal to or smaller than 1150 nm, and this is preferable. When the hole diameter is equal to or larger than 2 µm, in all the samples 4 to 7, the zero-dispersion wavelength becomes equal to or smaller than 1150 nm, and the degree of freedom of designing other parameters such as the core diameter and the relative refractive index difference $\Delta 1$ becomes high, and this is more preferable. In the samples 6 and 7, in the condition that the hole diameter is equal to or smaller than 1.5 µm, the confinement loss of light becomes extremely large, and this is not preferable.

In the condition that the hole diameter is equal to or smaller than 1 µm, when the hole is formed in the region of the core region, for example, the waveguide dispersion can be sufficiently shifted to the anomalous dispersion side. However, as described above, there is a large adverse effect of the structural loss due to the forming of the holes and the propagation loss generated due to the formation of the OH group in the core region at the time of manufacturing the fiber. Therefore, this is not preferable. Further, in the structure of a small number of holes like in the present embodiment, the means of performing drilling in the optical fiber base material using the mechanical drill is effective as described above. However, in this case, to set the hole diameter equal to or smaller than 1 µm in the state of the optical fiber, a diameter equal to or smaller than 1 mm needs to be drilled in the optical fiber base material. Therefore, this is very difficult in the manufacturing, and is not preferable in this aspect.

The hole diameter of the hole 12 is equal to or smaller than 8 µm. This is explained below in relation to the shortest distance D between the core region 11 and the hole 12. When the hole diameter becomes large, confinement of light to the core region 11 also becomes strong. That is, because confinement of light to the core region in the high-dimensional propagation mode of the optical fiber also becomes strong, the cutoff wavelength becomes large. On the other hand, even when the hole diameter is large, the cutoff wavelength can be made short by increasing the distance D or by decreasing the effective refractive index of the core region. However, when the distance D is increased, the shift amount of the waveguide dispersion obtained by forming the hole 12 becomes small. Therefore, it is difficult to set the zero-dispersion wavelength equal to or smaller than 1150 nm. Accordingly, preferably, the distance D is equal to or larger than 0 µm and equal to or smaller than 1.2 µm. When the cutoff wavelength is set equal to or smaller than 950 nm when the distance D is equal to or larger than 0 µm and equal to or smaller than 1.2 µm, the hole diameter of the hole 12 needs to be equal to or smaller than two times the core diameter of the core region 11. When the effective refractive index of the core region is made small, the confinement of light to the core region becomes small. Therefore, the confinement loss of light becomes large, and this is not preferable.

Figure 9:
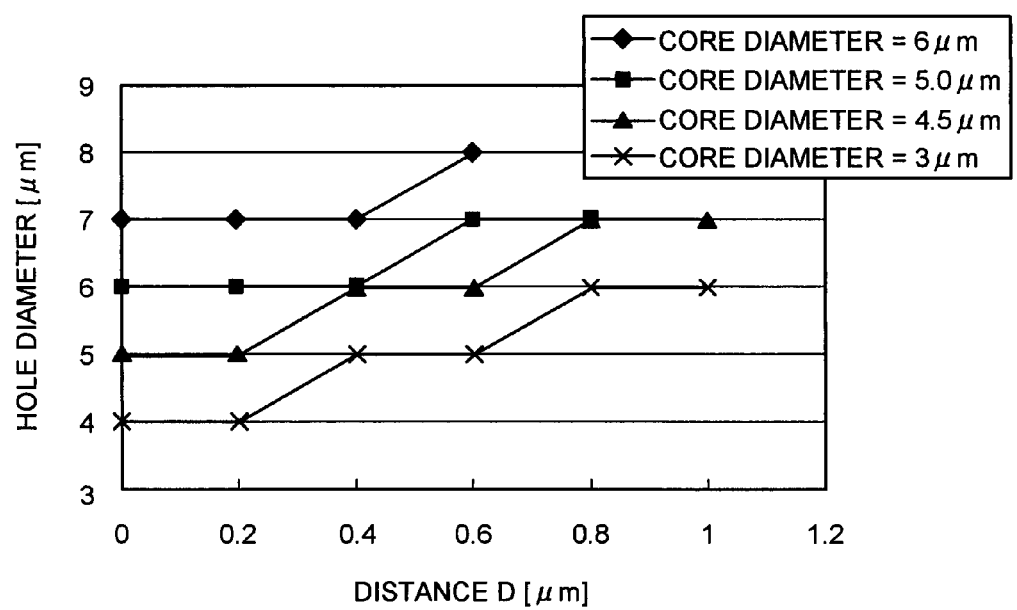
FIG. 9 is a graph of a relationship between the distance D and the hole diameter, in a condition that the cutoff wavelength is equal to or smaller than 950 nm and also the confinement loss of light in a wavelength of 950 nm to 1150 nm is equal to or smaller than 0.1 dB/km.

FIG. 9 depicts a relationship between the distance D and the hole diameter, in the condition that the cutoff wavelength is equal to or smaller than 950 nm and also the confinement loss of light in the wavelength of 1150 nm is equal to or smaller than 0.1 dB/km (hereinafter, condition 1), in the optical fiber 10. The relative refractive index difference of the core region 11 to the cladding region 13 is set 0.3% to 1.5%, and the core diameter is set 3 µm to 6 µm. In FIG. 9, the lateral axis represents the distance D, and the vertical axis represents a maximum value of the hole diameter satisfying the condition of the cutoff wavelength and the confinement loss in each distance D. That is, in each core diameter, the hole diameter needs to be set to a value equal to or smaller than those shown in FIG. 9. When the core diameter is 3.0 µm, the hole diameter needs to be set equal to or smaller than 6.0 µm. When the core diameter is 6.0 µm, the hole diameter needs to be set equal to or smaller than 8.0 µm. When the core diameter is 7.0 µm, a maximum value of the hole diameter satisfying the above condition 1 is 7.0 μm. In the optical fiber 10, the hole diameter of the hole 12 is equal to or smaller than 8.0 μm. Therefore, even when the core diameter is set 3 μm to 6 μm, the above condition 1 can be satisfied.

As described above, the shortest distance D between the core region 11 and the hole 12 is equal to or larger than 0 μm and equal to or smaller than 12 μm, and particularly, preferably, equal to or smaller than 0.6 μm. This is explained in detail below.

FIG. 10 depicts a relationship between the hole diameter of the hole 12, the distance D, and the relative refractive index difference Δ1 of the core region 11 satisfying a condition that when the core diameter of the core region 11 is 5 μm, the cutoff wavelength is shorter than 950 nm, the confinement loss of light in the wavelength of 1150 nm is equal to or smaller than 0.1 dB/km, and the zero-dispersion wavelength is shorter than 1150 nm (hereinafter, condition 2), in the optical fiber according to the first embodiment. That is, FIG. 10 depicts the range of the relative refractive index difference Δ1 of the core region 11 satisfying the condition 2, in the combination between the hole diameter shown in the vertical direction and the distance D shown in the lateral direction. When there is no relative refractive index difference Δ1 satisfying the condition 2, it is indicated by a hyphen.

As shown in FIG. 10, when the core diameter is 5 μm, to satisfy the above condition 2, the distance D needs to be set smaller than 1.0 μm. FIG. 11 depicts a relationship between the hole diameter of the hole 12, the distance D, and the relative refractive index difference Δ1 of the core region 11, when a condition that the zero-dispersion wavelength is set equal to or smaller than 1100 nm (hereinafter, condition 3) is added to the condition 2 in FIG. 10. To satisfy the condition 3, a larger waveguide dispersion is necessary. Therefore, the distance D needs to be set smaller than 0.4 μm. In this way, the optical fiber 10 becomes the optical fiber satisfying the conditions 2 and 3, by properly selecting the shortest distance D between the core region 11 and the hole 12, the hole diameter, and the relative refractive index difference Δ1.

FIG. 12 depicts a relationship between the hole diameter of the hole 12, the distance D, and the relative refractive index difference Δ1 of the core region 11 satisfying the condition 2, like the relationship shown in FIG. 10, when the core diameter of the core region 11 is 4 μm in the optical fiber according to the first embodiment. As shown in FIG. 12, when the core diameter is 4 μm, the distance D needs to be set smaller than 1.2 μm, to satisfy the above condition 2.

FIG. 13 depicts a relationship between the hole diameter 2, the distance D, and the relative refractive index difference Δ1 of the core region 11, when the condition 3 is further added to the condition 2 in FIG. 12. To satisfy the condition 3, the distance D needs to be set smaller than 0.8 μm. In this way, the optical fiber can satisfy the conditions 2 and 3, by properly selecting the shortest distance D between the core region 11 and the hole 12, the hole diameter, and the relative refractive index difference Δ1.

FIG. 14 depicts a relationship between the hole diameter of the hole 12, the distance D, and the relative refractive index difference Δ1 of the core region 11 satisfying the condition 2, like the relationship shown in FIG. 10, when the core diameter of the core region 11 is 3 μm in the optical fiber 10. As shown in FIG. 14, when the core diameter is 3 μm, the distance D needs to be set smaller than 1.4 μm, to satisfy the above condition 2.

FIG. 15 depicts a relationship between the hole diameter of the hole 12, the distance D, and the relative refractive index difference Δ1 of the core region 11, when the condition 3 is further added to the condition 2 in FIG. 14. To satisfy the condition 3, the distance D needs to be set smaller than 0.8 μm. In this way, the optical fiber can satisfy the conditions 2 and 3, by properly selecting the shortest distance D between the core region 11 and the hole 12, the hole diameter, and the relative refractive index difference Δ1.

FIG. 16 depicts a relationship between the hole diameter of the hole 12, the distance D, and the relative refractive index difference Δ1 of the core region 11 satisfying the condition 2, like the relationship shown in FIG. 10, when the core diameter of the core region 11 is 6 μm in the optical fiber according to the first embodiment. As shown in FIG. 16, when the core diameter is 6 μm, the distance D needs to be set smaller than 0.8 μm, to satisfy the above condition 2. In this way, the optical fiber can satisfy the condition 2, by properly selecting the shortest distance D between the core region 11 and the hole 12, the hole diameter, and the relative refractive index difference Δ1.

Similarly, the optical fiber 10 can become the optical fiber satisfying the condition 3, when the core diameter of the core region 11 is 6 μm, by properly selecting the shortest distance D between the core region 11 and the hole 12, the hole diameter, and the relative refractive index difference Δ1.

Next, a calculation result of the optical characteristic when the distance D is set to 0 μm in the optical fiber 10 is explained. FIG. 17 depicts various characteristics of samples 10 to 18 when the distance D is 0 μm in the optical fiber 10. In FIG. 7, $\lambda_0$ represents a zero-dispersion wavelength, and $LP_{01}$ represents confinement loss of light in the fundamental propagation mode.

The samples 10 to 18 shown in FIG. 17 have a zero-dispersion wavelength in the wavelength of 900 nm to 1150 nm. Particularly, the samples 10 to 15 have the zero-dispersion wavelength in the wavelength of 900 nm to 1100 nm. The samples 10 to 18 have the cutoff wavelength of 950 nm, and are optical fibers operating in the single mode in the wavelength region longer than 950 nm. The confinement loss of light in the wavelength of 1150 nm is equal to or smaller than 0.1 dB/km.

While the samples 10 and 11 have the same core diameters, the sample 11 has a larger hole diameter of the formed hole 12, and has a slightly smaller refractive index of the core region 11. Therefore, the sample 11 can obtain a larger waveguide dispersion than that of the sample 10, and can shift the zero-dispersion wavelength to a wavelength shorter than 1050 nm. When the sample 12 is compared with the sample 13, the sample 12 having a larger hole diameter has a shorter zero-dispersion wavelength than the sample 13. This is because the influence of the waveguide dispersion of the hole unit 12 is large. The structure of the sample 13 has a smaller confinement of light due to the hole 12 than the structure of the sample 12. By the portion of the small effective refractive index of the core region, confinement loss of light occurs, and the value of the confinement loss 0.07 dB/km is relatively large.

A relationship between the samples 14 and 15, and a relationship between the samples 16 and 17 also have a similar characteristic. Because both compared samples have different hole diameters of the hole 12 like that explained above, there is a large difference between the obtained waveguide dispersions. A sample having a larger hole diameter can obtain a zero-dispersion wavelength in the shorter wavelength. To obtain a large waveguide dispersion, the size of the core region is important. As shown in FIG. 17, when the core diameter becomes smaller, the zero dispersion wavelength can be easily shifted to the short wavelength. On the other hand, when the core diameter becomes large, the zero-dispersion wavelength is shifted to the wavelength shorter than the wavelength of 1150 nm, by increasing the hole diameter and by decreasing the effective refractive index by decreasing the refractive index of the core region 11, like the sample 18, for example.

Next, characteristics of an optical fiber according to an Example 1 manufactured according to the first embodiment are explained. In the optical fiber according to the Example 1, the core region is silica glass doped with germanium, and has the relative refractive index difference $\Delta 1$ of 0.72%, with the core diameter being 4.3 μm. Holes are laid out at equal distances from the center of the core region. When the distance between the center of each hole and the center of the core region is L1, L1=5 μm. Each hole has a positional relationship of a four-fold rotational symmetry around the center of the core region. The holes are circular in the fiber cross section, and the cross-sectional areas of the four holes are equal, each hole having a hole diameter of 5.2 μm. The distance D is 0.25 μm.

A method of manufacturing the optical fiber according to the Example 1 is as follows. First, a porous fiber base material doped with germanium is manufactured by the VAD method, and this is vitrified to form silica glass. The relative refractive index difference of the glass to the pure silica is 0.72%, and the refractive-index distribution shape is a step-index shape. This is made as the core region. A pure silica layer is formed at the outside of the core region by the JVD method, thereby manufacturing the base material having an external diameter of 46.15 mm and having a diameter of the core region as 2.48 mm. This base material is drilled and the hole inner surface is ground to form a finished diameter of 3 mm, by the mechanical drill. This base material is drawn to have an external diameter of the fiber cladding as 80 μm.

Figure 18:
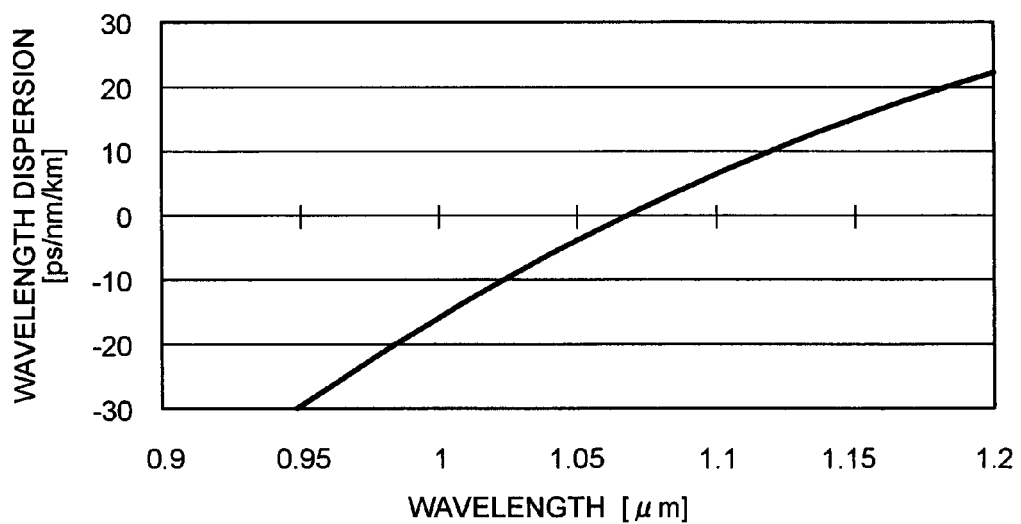
FIG. 18 is a graph showing dispersion characteristic of an optical fiber according to an Example 1.

Characteristics of the optical fiber according to the Example 1 manufactured by the above method are explained. First, regarding the dispersion characteristic, as shown in FIG. 18, the zero-dispersion characteristic is 1065 nm, and achieves the zero-dispersion wavelength of a wavelength shorter than the wavelength of 1110 nm. The cutoff wavelength is 880 nm, and the optical fiber operates in the single mode in the wavelength of 930 nm to 1150 nm as the infrared region. The transmission loss in the wavelength of 1150 nm is 1.2 dB/km, and the difference between the propagation loss in the wavelength of 1100 nm and that in the wavelength of 1150 nm is as small as 0.2 dB/km. Therefore, confinement loss is substantially zero.

In the Example 1, while the external diameter of the cladding is set 80 μm, the external diameter can be changed to 50 μm to 150 μm, by changing the usage. For example, consider the manufacturing of a fiber having the same characteristic in the external diameter of 125 μm. An optical fiber having the same characteristic as that of the optical fiber according to the Example 1 can be obtained, by manufacturing a base material having the external diameter of about 48.1 mm and the core diameter of 1.65 mm, providing holes of the same diameter of 2 mm as that explained above, and by drawing the base material so that the external diameter becomes 125 μm.

Next, characteristics of an optical fiber according to an Example 2 manufactured according to the first embodiment are explained. In the optical fiber according to the Example 2, the core region is silica glass doped with germanium, and has the relative refractive index difference $\Delta 1$ of 0.58%, with the core diameter being 4.5 μm. Holes are laid out at equal distances from the center of the core region. When the distance between the center of each hole and the center of the core region is L1, L1=5.3 μm. Each hole has a positional relationship of a four-fold rotational symmetry around the center of the core region. The holes are circular in the fiber cross section, and the cross-sectional areas of the four holes are equal, each hole having a hole diameter of 5.5 μm. The distance D is 0.3 μm.

A method of manufacturing the optical fiber according to the Example 2 is as follows. First, a porous fiber base material doped with germanium is manufactured by the VAD method, and this is vitrified to form silica glass. The relative refractive index difference of the glass to the pure silica is 0.58%, and the refractive-index distribution shape is a step-index shape. This is made as the core region. A pure silica layer is formed at the outside of the core region by the JVD method, thereby manufacturing the base material having an external diameter of 44 mm and having a diameter of the core region as 2.475 mm. This base material is drilled and the hole inner surface is ground to form a finished diameter of 3 mm, by the mechanical drill. This base material is drawn to have an external diameter of the fiber cladding as 80 μm.

Figure 19:
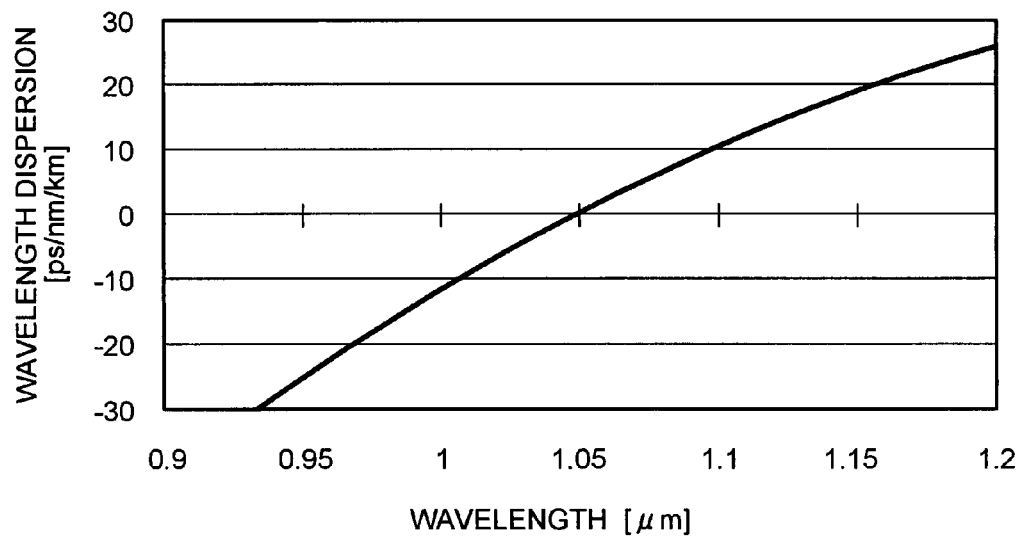
FIG. 19 is a graph showing dispersion characteristic of an optical fiber according to an Example 2.

Characteristics of the optical fiber according to the Example 2 manufactured by the above method are explained. First, regarding the dispersion characteristic, as shown in FIG. 19, the zero-dispersion characteristic is 1049 nm, and achieves the zero-dispersion wavelength of a wavelength shorter than the wavelength of 1050 nm. The cutoff wavelength is 930 nm, and the optical fiber operates in the single mode in the wavelength of 930 nm to 1150 nm as the infrared region. The transmission loss in the wavelength of 1150 nm is 1.0 dB/km, and the transmission loss in the wavelength of 970 nm to 1150 nm is equal to or smaller than 1.0 dB/km. The transmission loss in the wavelength of 950 nm is 5 dB/km, because of the influence of loss due to the OH group. The difference between the propagation loss in the wavelength of 1100 nm and that in the wavelength of 1150 nm is 0.4 dB/km. However, because the influence of loss due to the OH group is large as described above, the confinement loss is small, and can be said as substantially zero.

Next, characteristics of an optical fiber according to Examples 3 and 4 manufactured according to the first embodiment are explained. For the optical fiber according to the Example 3, four kinds of optical fibers are manufactured, having the same structure as that in the Example 2, having the core diameter of 4.5 μm, the hole diameter of 5.5 μm, and the distance D of 0.3 μm, and four kinds of the relative refractive index difference $\Delta 1$ as 0.6%, 0.8%, 1.0%, and 1.1%. On the other hand, for the optical fiber according to the Example 4, eight kinds of optical fibers are manufactured, having the core diameter of 4 μm, the hole diameter of 4 μm, and the distance D of 0.3 μm, and eight kinds of the relative refractive index difference $\Delta 1$ as 0.6% to 1.3%, by differentiating each 0.1%. As a result of measuring the zero-dispersion wavelength of the manufactured optical fibers according to the Examples 3 and 4, the zero-dispersion wavelength is within the range of 1060 nm to 1070 nm.

As an inclination of the optical fiber according to the present invention, when the refractive index of the core region takes a large value as described above, the wavelength range in which the confinement loss is suppressed can be shifted to the long wavelength, and at the same time, the cutoff wavelength also becomes large. A relationship between the relative refractive index difference $\Delta 1$, the wavelength in which the confinement loss is suppressed, and the cutoff wavelength is explained below with reference to the characteristics of the optical fibers according to the Examples 3 and 4.

Figure 20:
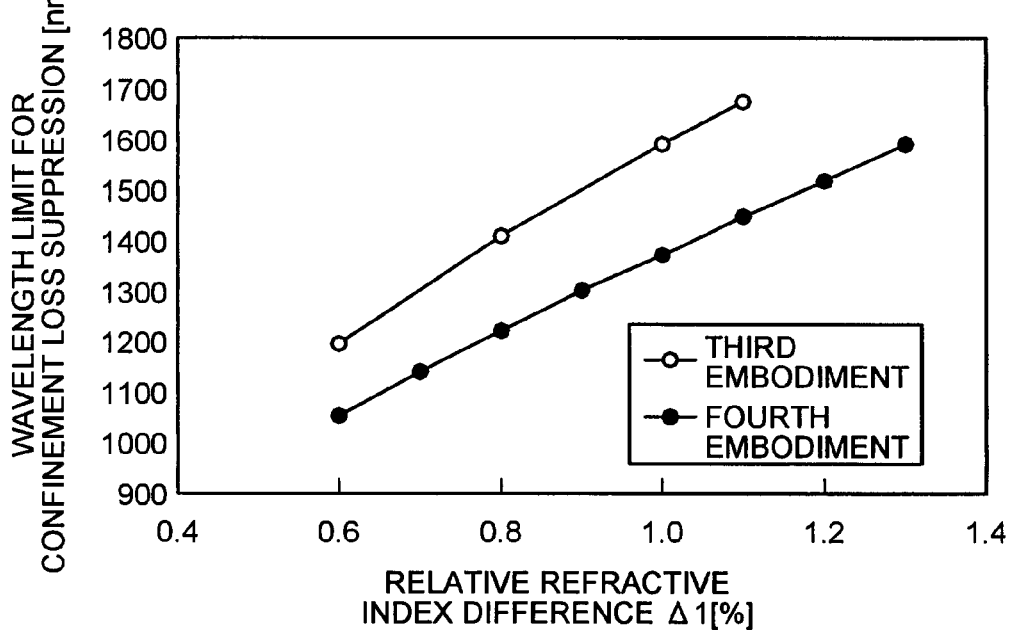
FIG. 20 is a graph of a relationship between the relative refractive index difference Δ1 and a wavelength limit in a long wavelength in which confinement loss is suppressed in optical fibers according to Examples 3 and 4.

FIG. 20 depicts a relationship between the relative refractive index difference $\Delta 1$ and a wavelength limit in a long wavelength in which the confinement loss is suppressed in the optical fibers according to the Examples 3 and 4. That is, in the region of a longer wavelength than the values shown in FIG. 20, the confinement loss increases rapidly. Therefore, light propagation in the long distance becomes difficult. As shown in FIG. 20, when the relative refractive index difference Δ1 is set high, the wavelength range in which light propagation with small confinement loss is possible expands to a long wavelength side.

Figure 21:
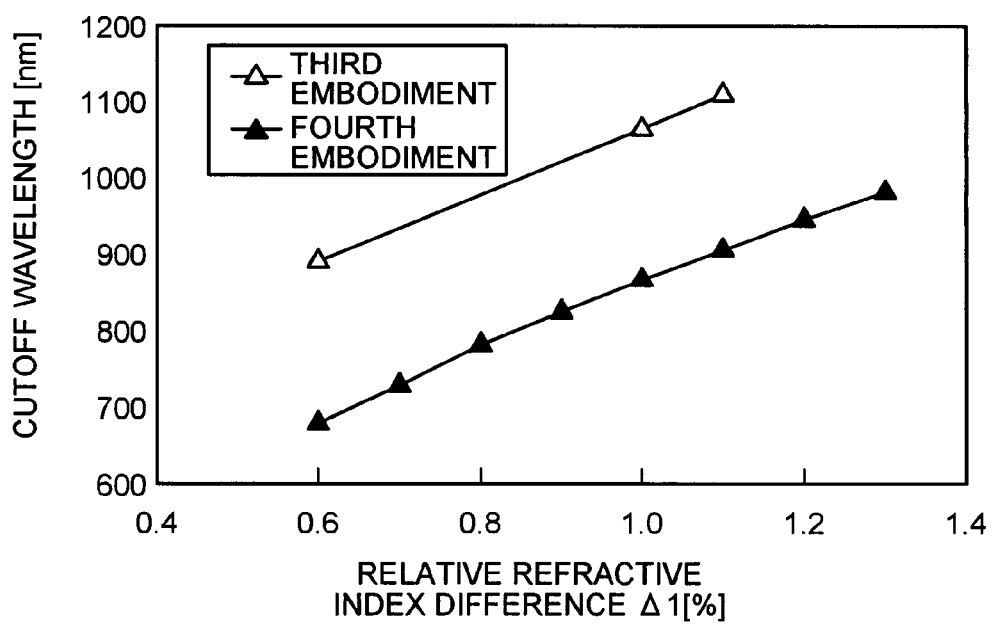
FIG. 21 is a graph of a relationship between the relative refractive index difference Δ1 and the cutoff wavelength in the optical fibers according to the Examples 3 and 4.

On the other hand, FIG. 21 depicts a relationship between the relative refractive index difference Δ1 and the cutoff wavelength in the optical fibers according to the Examples 3 and 4. As shown in FIG. 20, the cutoff wavelength becomes a long wavelength, when the relative refractive index difference Δ1 is set high.

Therefore, in the optical fibers according to the Examples 3 and 4, a wavelength range in which the optical fibers operate in the single mode and can propagate light at low loss at a predetermined relative refractive index difference Δ1 can be known from FIGS. 20 and 21. For example, when the optical fiber according to the Example 3 has the relative refractive index difference Δ1 as 0.6%, the optical fiber operates in the single mode and can propagate light at low loss, in the wavelength range of 900 nm to 1190 nm. When the relative refractive index difference Δ1 is set 0.8%, the optical fiber operates in the single mode and can propagate light at low loss, in the wavelength range of 1000 nm to 1400 nm, that is, in the wavelength range including 1.0 μm to 1.31 μm.

On the other hand, in the case of the optical fiber according to the Example 4, as shown in FIGS. 20 and 21, when the relative refractive index difference Δ1 is increased to 1.3%, the optical fiber operates in the single mode and can propagate light at low loss, in the wavelength range of about 1000 nm to 1600 nm. That is, it is possible to realize the optical fiber that operates in the single mode and can propagate light at low loss, in the wavelength range of about 1000 nm to 1600 nm, and in the zero-dispersion wavelength range of 1060 nm to 1070 nm.

An optical fiber according to a second embodiment of the present invention is explained next. The optical fiber according to the second embodiment has four sub-holes to have a four-fold rotational symmetry around the center of a core region at a position separated from the core region from the holes within the cladding region of the optical fiber according to the first embodiment.

Figure 22:
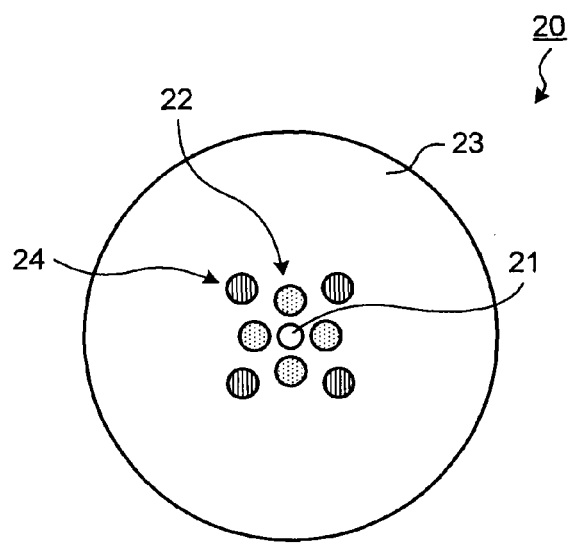
FIG. 22 is a cross section of an optical fiber according to a second embodiment of the present invention.

FIG. 22 is a schematic cross-sectional view of an optical fiber 20 according to the second embodiment. Like the optical fiber 10, the optical fiber 20 has a cladding region 23 having a lower refractive index than that of a core region 21 at the outer circumference of the core region 21, has four holes 22 formed to have a four-fold rotational symmetry around the center of the core region 21 near the core region 21 within the cladding region 23, and has zero-dispersion wavelength of 900 nm to 1150 nm and a cutoff wavelength of 950 nm. Further, the optical fiber 20 has four sub-holes 24 formed to have a four-fold rotational symmetry around the center of the core region 21 at a position separated from the core region 21 from the holes 22. The four sub-holes 24 are laid out on a straight line passing through the center of the core region 21 crossing at the right angle with a line connecting between the adjacent inside holes 22.

Based on the provision of the above configuration, the optical fiber 20 can be easily manufactured at low cost, like the optical fiber 10, and becomes a single-mode optical fiber suitable for transmitting light of the wavelength of 900 nm to 1150 nm. Further, based on the four sub-holes 24, confinement loss of light from the core region 21 to the cladding region 23 can be more decreased.

Characteristics of the core region 21 and the holes 22 of the optical fiber 20 and the shortest distance are similar to those of the optical fiber 10. Regarding the waveguide dispersion of the optical fiber 20, the influence of the holes 22 is ruling. Further, preferably, the hole diameters of the sub-holes 24 are the same as the hole diameters of the holes 22. The shortest distance D between the core region 21 and the sub-hole 24 greatly depends on the distance between the four holes 22 and the core region 21, and the hole diameter and the core diameter. Preferably, at least the shortest distance D is larger than D2 μm defined by $$D2=\{(A1+B1)/2+L2\}\times\sqrt{2}-(A1+B1)/2$$

where A1 represents a core diameter of the core region 21, B1 represents a hole diameter of the hole 22, L2 represents a distance between the center of the core region 21 and the center of the hole 22, and units of A1, B1, and L2 are μm.

A third embodiment of the present invention is explained next. An optical fiber according to the third embodiment has a configuration similar to that of the optical fiber according to the first embodiment, and has a hole-collapsed portion formed by collapsing the hole at the end in the longitudinal direction. The hole-collapsed portion propagates light of the wavelength of 950 nm in the single mode.

Figure 23:
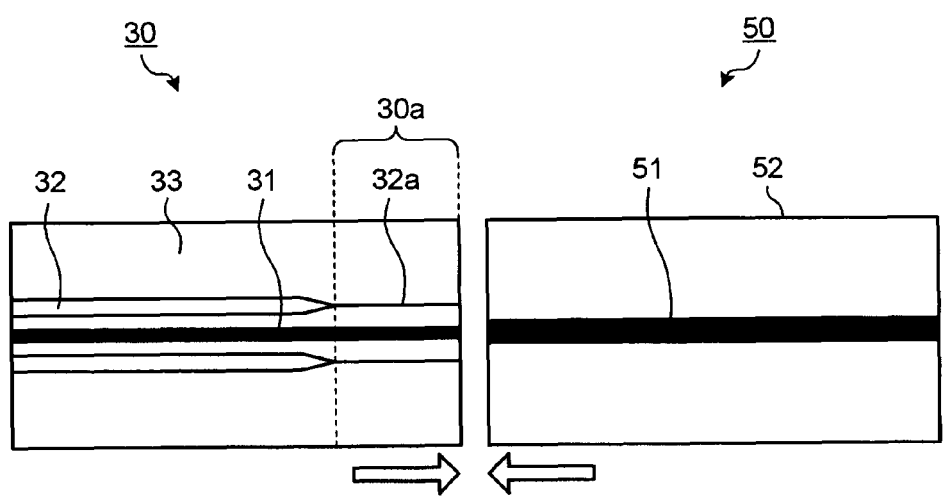
FIG. 23 is a longitudinal cross section of an optical fiber according to a third embodiment of the present invention and a single-mode optical fiber to be connected.

FIG. 23 is a schematic cross-sectional view in the longitudinal direction for depicting the optical fiber according to the third embodiment and a single-mode optical fiber connected thereto. The single-mode optical fiber 50 has a core region 51 and a cladding region 52. The cutoff wavelength is 850 nm, and the transmission loss is equal to or smaller than 1.5 dB/km in the range of the wavelength of 900 nm to 1150 nm. An optical fiber 30 has a configuration similar to that of the optical fiber 10, and has a hole-collapsed portion 30a formed by collapsing a hole 32 at the end in the longitudinal direction. Reference numerals 31, 33, and 32a denote a core region, a cladding region, and a collapsed hole. The optical fiber 30 can be manufactured by forming the hole-collapsed portion 30a by heating the end of the optical fiber 10. The core diameter and the refractive index of the core region of the single-mode optical fiber 50 are the same as those of the optical fiber 30.

According to the optical fiber 30, the hole-collapsed portion 30a operates in the single mode to light of the wavelength equal to or larger than 950 nm. Therefore, when the optical fiber 30 is connected to the single-mode optical fiber 50 of the usual structure having the core region 51 and the cladding region 52, the optical fiber 30 can perform the single-mode operation over the total of the optical fiber 30 including the hole-collapsed portion 30a and the single-mode optical fiber 50.

When the hole clock unit is formed by collapsing the holes by heating the end of the optical fiber according to the Examples 1 and 2, and when the optical fiber formed with the hole-collapsed portion is connected to other single-mode optical fiber, the total connected optical fibers perform the single-mode operation of light of the wavelength of 900 nm. That is, in both optical fibers, the cutoff wavelength of the hole-collapsed portion is estimated to be equal to or smaller than 900 nm.

A fourth embodiment of the present invention is explained next. An optical fiber according to the fourth embodiment has a configuration similar to that of the optical fiber according to the first embodiment, and has a hole-collapsed portion formed by filling a medium having a refractive index equal to or smaller than that of the cladding region into the holes at the end in the longitudinal direction. The hole-filled portion propagates light of the wavelength of 950 nm in the single mode.

Figure 24:
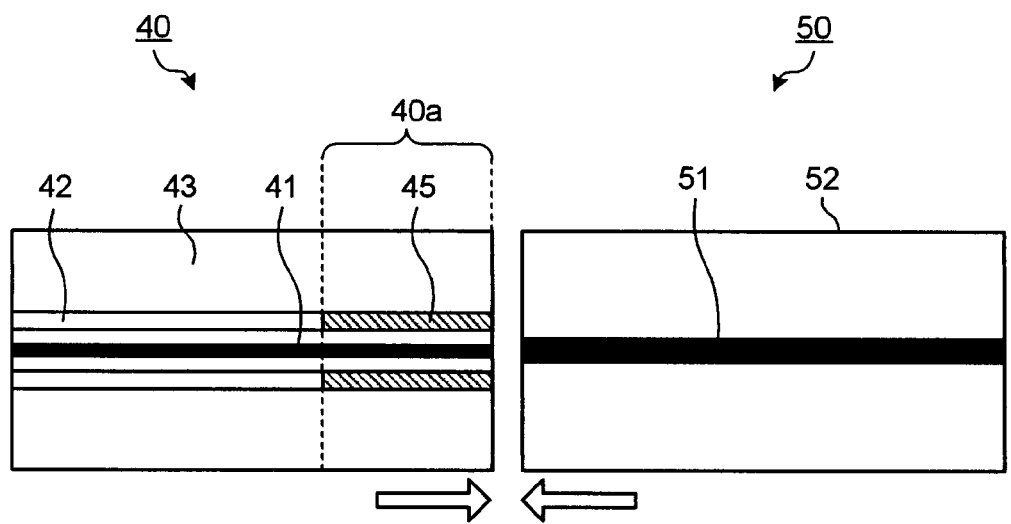
FIG. 24 is a longitudinal cross section of an optical fiber according to a fourth embodiment of the present invention and a single-mode optical fiber to be connected.

FIG. 24 is a schematic cross-sectional view in the longitudinal direction for depicting the optical fiber according to the fourth embodiment and a single-mode optical fiber connected thereto. The single-mode optical fiber 50 is that described above. An optical fiber 40 has a configuration similar to that of the optical fiber 10, and has a hole-filled portion 40a formed by filling a refractive-index matching agent 45 having a refractive index equal to or smaller than that of the cladding region 43 into holes 42 at the end in the longitudinal direction. Reference numeral 41 denotes a core region.

According to the optical fiber 40, the hole-filled portion 40a operates in the single mode to light of the wavelength equal to or larger than 950 nm. Therefore, when the optical fiber 40 is connected to the single-mode optical fiber 50 of the usual structure having the core region 51 and the cladding region 52, the optical fiber 40 can perform the single-mode operation over the total of the optical fiber 40 including the hole-filled portion 40a and the single-mode optical fiber 50.

A fifth embodiment of the present invention is explained next. An optical fiber according to the fifth embodiment has a configuration similar to that of the optical fiber according to the first embodiment, and guides light of the wavelength of 900 nm to 1150 nm.

Figure 25:
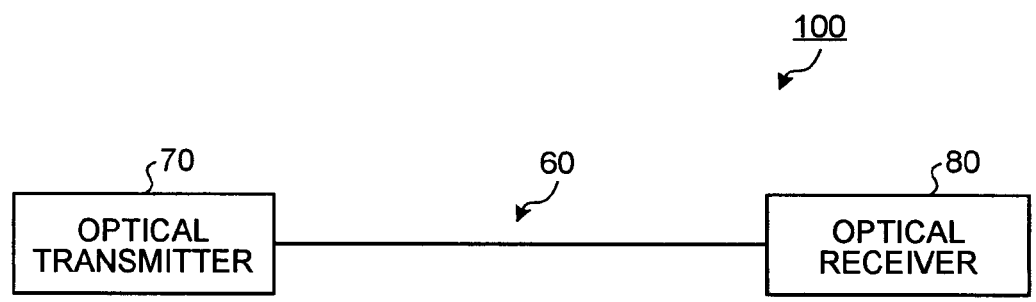
FIG. 25 is a block diagram of an optical transmission system having an optical waveguide according to a fifth embodiment of the present invention.

FIG. 25 is a block diagram of an optical transmission system 100 having an optical waveguide according to the fifth embodiment. The optical transmission system 100 includes an optical transmitter 70, an optical receiver 80, and an optical fiber 60 as an optical waveguide for connecting between the optical transmitter 70 and the optical receiver 80. The optical fiber 60 has characteristics similar to that of the optical fiber according to the first embodiment. The optical transmitter 70 and the optical receiver 80 transmit and receive, respectively of signal light of the wavelength of 900 nm to 1150 nm. The optical transmission system 100 uses the optical fiber 60 according to the fifth as an optical waveguide, thereby transmitting signal light of the wavelength of 900 nm to 1150 nm in satisfactory transmission characteristics.

As described above, according to an aspect of the present invention, a single-mode optical fiber suitable for transmitting a light having a wavelength of 900 nm to 1150 nm, and an optical waveguide including the optical fiber can be manufactured at low cost.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber comprising:
   a core region having a first refractive index; and
   a cladding region having a second refractive index lower than the first refractive index, the cladding region surrounding the core region,
   wherein the cladding region includes only four holes formed in a four-fold rotational symmetry around the core region with respect to a center axis and in a longitudinal direction, such that a zero-dispersion wavelength is 900 nm to 1150 nm and a cutoff wavelength is equal to or shorter than 950 nm,
   a relative refractive index difference of the core region with respect to the cladding region is 0.3% to 1.5%,
   a diameter of the core region is equal to or larger than 3 μm and equal to or smaller than 7 μm,
   a diameter of each of the holes is larger than 1 μm and equal to or smaller than 8 μm, and
   a shortest distance D between the core region and each of the holes defined by D={L−(A+B)}/2 is equal to or larger than 0 μm and equal to or smaller than 1.2 μm, where A is a diameter of the core region in micrometers, B is a diameter of each of the holes in micrometers, and L is a distance between centers of the core region and the holes in micrometers.

2. The optical fiber according to claim 1, wherein the cutoff wavelength is equal to or shorter than 900 nm.

3. The optical fiber according to claim 1, wherein the zero-dispersion wavelength is 900 nm to 1100 nm.

4. The optical fiber according to claim 3, wherein the zero-dispersion wavelength is 900 nm to 1050 nm.

5. The optical fiber according to claim 1, wherein propagation loss in a wavelength of 900 nm to 1150 nm is equal to or lower than 10 dB/km.

6. The optical fiber according to claim 5, wherein the propagation loss is equal to or lower than 3 dB/km.

7. The optical fiber according to claim 6, wherein a difference between propagation loss in a wavelength of 1100 nm and propagation loss in a wavelength of 1150 nm is equal to or smaller than 1 dB/km.

8. The optical fiber according to claim 1, wherein the core region is formed with germanium or phosphorus-doped silica glass.

9. The optical fiber according to claim 1, wherein the relative refractive index difference is 0.5 to 1.0%.

10. The optical fiber according to claim 1, wherein the diameter of the core region is smaller than 6 μm.

11. The optical fiber according to claim 1, wherein the shortest distance D is equal to or smaller than 0.6 μm.

12. The optical fiber according to claim 1, wherein
    the cladding region further includes a hole-collapsed portion formed by collapsing longitudinal ends of the holes, and
    the hole-collapsed portion propagates a light having a wavelength of 950 nm in single mode.

13. The optical fiber according to claim 1, wherein
    the cladding region further includes a hole-filled portion formed by filling a medium having a refractive index equal to or lower than that of the cladding region into longitudinal ends of the holes, and
    the hole-filled portion propagates a light having a wavelength of 950 nm in single mode.

14. An optical waveguide comprising:
    an optical fiber including
    a core region having a first refractive index, and
    a cladding region having a second refractive index lower than the first refractive index, the cladding region surrounding the core region,
    wherein the cladding region includes only four holes formed to have a four-fold rotational symmetry around the core region with respect to a center axis and in a longitudinal direction, such that a zero-dispersion wavelength is 900 nm to 1150 nm and a cutoff wavelength is equal to or shorter than 950 nm,
    a relative refractive index difference of the core region with respect to the cladding region is 0.3% to 1.5%,
    a diameter of the core region is equal to or larger than 3 μm and equal to or smaller than 7 μm,
    a diameter of each of the holes is larger than 1 μm and equal to or smaller than 8 μm, and
    a shortest distance D between the core region and each of the holes defined by D={L−(A+B)}/2 is equal to or larger than 0 μm and equal to or smaller than 1.2 μm, where A is a diameter of the core region in micrometers, B is a diameter of each of the holes in micrometers, and L is a distance between centers of the core region and the holes in micrometers, and
    the optical waveguide guides a light having a wavelength of 900 nm to 1150 nm.

* * * * *